Patented Feb. 8, 1949

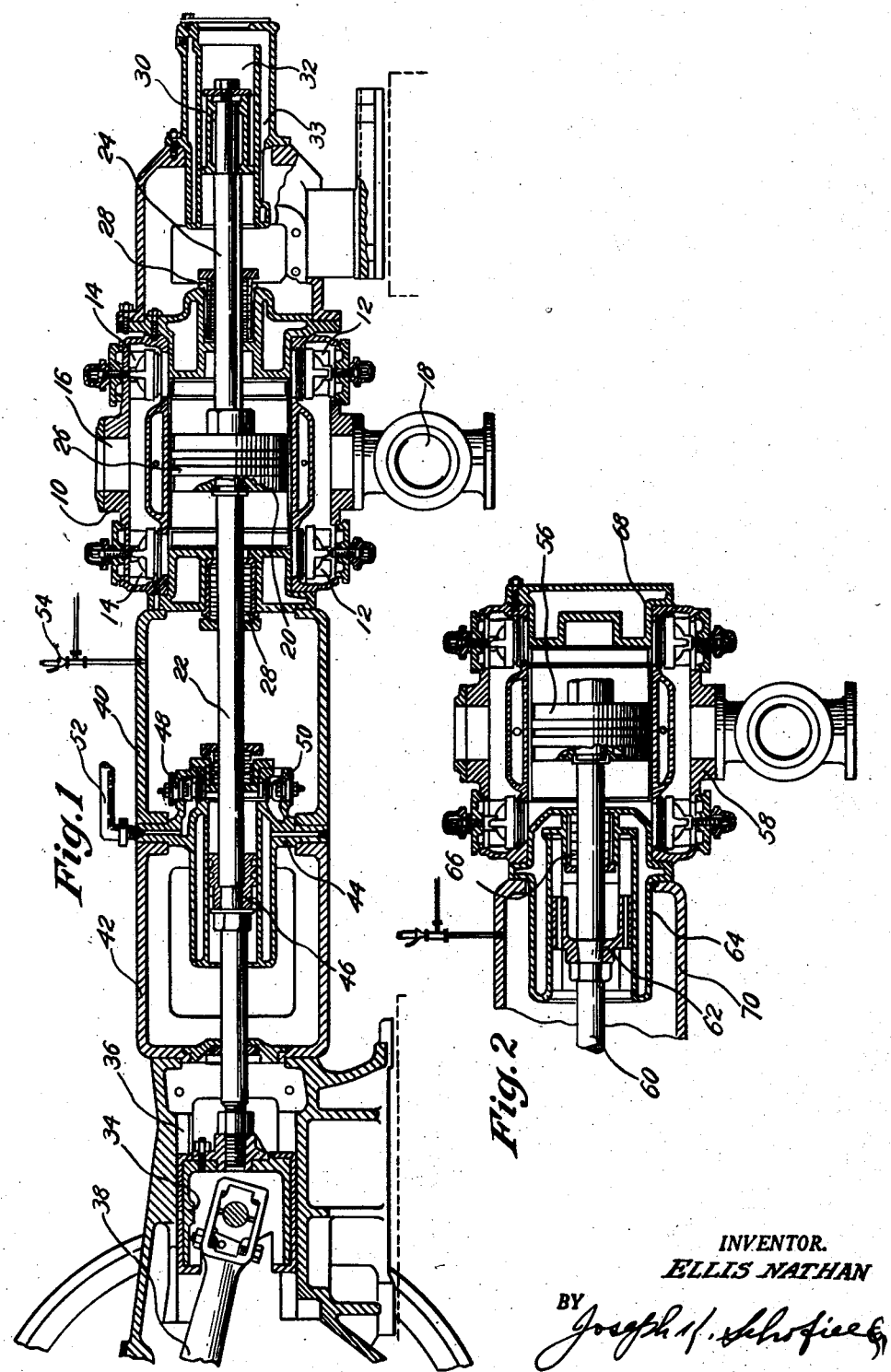

2,461,294

UNITED STATES PATENT OFFICE 2,461,294

SEAL FOR GAS COMPRESSORS

Ellis Nathan, Easton, Pa., assignor to Pennsylvania Pump & Compressor Company, Easton, Pa., a corporation of Pennsylvania Application May 21, 1946, Serial No. 671,242

3 Claims. (Cl. 230—203)

This invention relates to compressors and particularly to a compressor for gases such as pure chlorine, hydrocarbons, and other obnoxious gases required to be compressed to a relatively high pressure.

A primary object of the invention is to provide a sealing means for the compressing cylinder of a gas compressor of this type to prevent escape of the gas being compressed past the piston rod packing to the atmosphere.

A feature that enables the above object to be accomplished is that an intermediate chamber is provided adjacent the gas compressing cylinder and enclosing a portion of the driving end of the piston rod within which air or an inoffensive gas may be compressed to a higher pressure than the pressure to which the chlorine or other gas is being compressed within the principal compressing cylinder.

Another feature that is important is that a single cylinder gas compressor may have a compressor piston formed on its piston rod for compressing air within an auxiliary cylinder, inlet and discharge valves being mounted on the member forming the cylinder for this auxiliary compressor piston.

And finally it is an object of the invention to provide special carbon or other non-metal packings for the piston rod to effectively support the principal and auxiliary pistons thereon to avoid contact of the metal pistons 20 with the walls of the cylinders.

Other objects of the invention will be evidenced from the following description, due reference being made to the accompanying drawing showing a preferred form of the invention and in which Figure 1 is a longitudinal sectional view of one form of compressor embodying the present invention, and Figure 2 is a similar view showing the principal parts of a modified form of the invention.

In its preferred form the invention may include the following principal parts: First, a principal gas compressing cylinder having a piston movable therein and having suitable intake and discharge valves thereon; second, a piston rod attached at one end to said piston and having driving means at its opposite end; third, a second piston on said piston rod of less diameter than said gas compressing piston; fourth, a cylinder surrounding said smaller piston, having one or more intake and discharge valves mounted therein; fifth, a diaphragm supporting said cylinder for said smaller piston; and sixth, chambers formed on either side of said diaphragm in said compressor frame, the chamber disposed between the pistons and surrounding the piston rod being pressure tight.

Referring more in detail to the figures of the drawing and first to Fig. 1, it will be seen that there has been provided a compressor cylinder 10 having the usual inlet and discharge valves 14 and 12. The gas such as chlorine or other obnoxious gas being compressed is admitted at an inlet 16 and is discharged from the compressor at 18. Within the compressor operates a piston 20 mounted on piston rod 22.

As shown in Fig. 1, the piston, which as usual may be formed of cast iron, is supported from opposite ends by the piston rod 22 and its rear extension 24. By this means the weight of the piston 20 is so supported that it does not bear against the cylinder walls. Fluid tight contact between the piston and cylinder wall is made by non-metallic packings 26 to avoid generating unnecessary frictional heat. At opposite ends of the cylinder 10 are cylinder heads having bearings 28 therein which also may have non-metallic packings for the same purpose.

On the piston rod extension 24 is provided a suitable bearing or support 30 slidable within a suitable cylinder 32. By this cylinder 32 and its supporting bearing for the piston 20, piston 20 is maintained in alinement within its cylinder and with its weight removed from its cylinder wall.

On the driving side of the piston 20 the piston rod 22 is provided with a similar bearing support 34 in the form of a crosshead movable within guideways 36 to support the piston 20 from the driving end of the rod 22. A connecting rod 38 may be pivotally attached to the cross head 34 from which the compressor may be driven from any suitable source of power.

Between the cylinder 10 and the member having guideways 36 for the piston rod 22 are frame members 40 and 42 which are secured to each other and to the cylinder 10 to form a rigid mounting for the cylinder and attached parts of the compressor. Disposed between these frame members 40 and 42 is a diaphragm 44 bolted to the frame members and having a central longitudinally extending cylinder within which operates piston 46. This piston, it will be seen, is supported in the same manner as piston 20 so that it is not in direct contact with its cylinder wall. Non-metallic packings may be provided for maintaining fluid tight contact with the cylinder wall. At the inner end of member 46 adjacent cylinder 10 are mounted intake and discharge valves 48 and 50. An intake passage from the periphery of the diaphragm leads to the intake valve 48 and a discharge passage leads from valve 50 to the interior of chamber 40 which is completely enclosed and pressure tight. The intake passage may have attached thereto any form of conduit 52 which may be connected to atmosphere or to a chamber containing ethane, methane or propane or any other non-obnoxious gas.

From the above described mechanism it will be seen that reciprocation of the piston rod 22 not only operates piston 20 to compress the gas admitted from intake 16 but also provides a supplementary compressor by reciprocation of piston 46. A double acting compressor is provided by piston 20 while a single acting compressor only is formed by piston 46. A pressure therefore will be built up within the chamber 40 which may be limited by a pressure relief valve 54. Preferably the pressure for which the valve 54 is set will be higher than the discharge pressure from the compressor cylinder 10. By this means leakage from cylinder 10 past packing 28 into chamber 40 is prevented and any flow will be from the chamber 40 to the cylinder 10. Also any leakage from chamber 40 will be of air or one of the gases admitted to this chamber through inlet conduit 52.

The cylinder 32 may be water-jacketed in the usual manner and may have its opposite ends connected by a conduit 33 communicating between the ends to eliminate any compressing by reciprocation of piston 30. This cylinder and its mounting completely enclose this end of cylinder 10. This conduit 33 and the space within the cylinder 32 may also be supplied either with air by a connection to atmosphere or to a supply of a non-obnoxious gas similar to that supplied to the chamber 40.

Referring to Fig. 2 it will be seen that the piston 56 within cylinder 58 is supported entirely from its driving side. No piston rod extension is provided as shown in Fig. 1 but piston rod 60 adjacent the piston 56 is provided with a support 62 engaging guideways 64 formed in a frame member 64. This frame member forms the crank end cylinder head for cylinder 58 and is provided with non-metallic packing 66.

The cylinder 58 may be and preferably is similar in every way to cylinder 10 and is provided with the usual intake and discharge valves. Its head end is closed by a conventional cylinder head 68. As shown, the crank end cylinder head 64 is interposed between cylinder 58 and a chamber member 70 corresponding in every way to member 40 in Fig. 1. Within the member 64 forming the cylinder head may be formed a water jacket for cooling the cylinder walls within which the support 62 operates.

I claim:

1. A compressor for gases comprising a gas compressing cylinder having intake and discharge valves mounted therein, an auxiliary compressing cylinder adjacent thereto, a piston rod having pistons thereon operating within said cylinders, a closed chamber into which the discharge from said auxiliary cylinder discharges, said chamber being connected at one end to said gas compressing cylinder and to said auxiliary compressing cylinder at its opposite end, and a piston rod packing between said chamber and gas compressing cylinder.

2. A compressor for gases comprising a gas compressing cylinder having intake and discharge valves mounted therein, an auxiliary compressing cylinder adjacent thereto, a piston rod having pistons thereon operating within said cylinders, a closed chamber into which the discharge from said auxiliary cylinder discharges and an intake conduit for said auxiliary compressing cylinder connected to atmosphere, said chamber being connected at one end to said gas compressing cylinder and to said auxiliary compressing cylinder at its opposite end, and a piston rod packing between said chamber and gas compressing cylinder.

3. A compressor for gases comprising a gas compressing cylinder having intake and discharge valves mounted therein, an auxiliary compressing cylinder adjacent thereto, a piston rod having pistons thereon operating within said cylinders, a closed chamber into which the discharge from said auxiliary cylinder discharges and an intake conduit for said auxiliary compressing cylinder leading to a separate source of gas from said principal gas compressing cylinder intake conduit, said chamber being connected at one end to said gas compressing cylinder and to said auxiliary compressing cylinder at its opposite end, and a piston rod packing between said chamber and gas compressing cylinder.

ELLIS NATHAN.

REFERENCES CITED

The following references are of record in the file of this patent:

UNITED STATES PATENTS

| Number | Name | Date |
|---|---|---|
| 1,792,646 | Leonard | Feb. 17, 1931 |
| 2,041,659 | Hunt | May 19, 1936 |
| 2,136,599 | Thompson et al. | Nov. 15, 1938 |
| 2,204,374 | Metzgar | June 11, 1940 |